Patented Dec. 8, 1925.

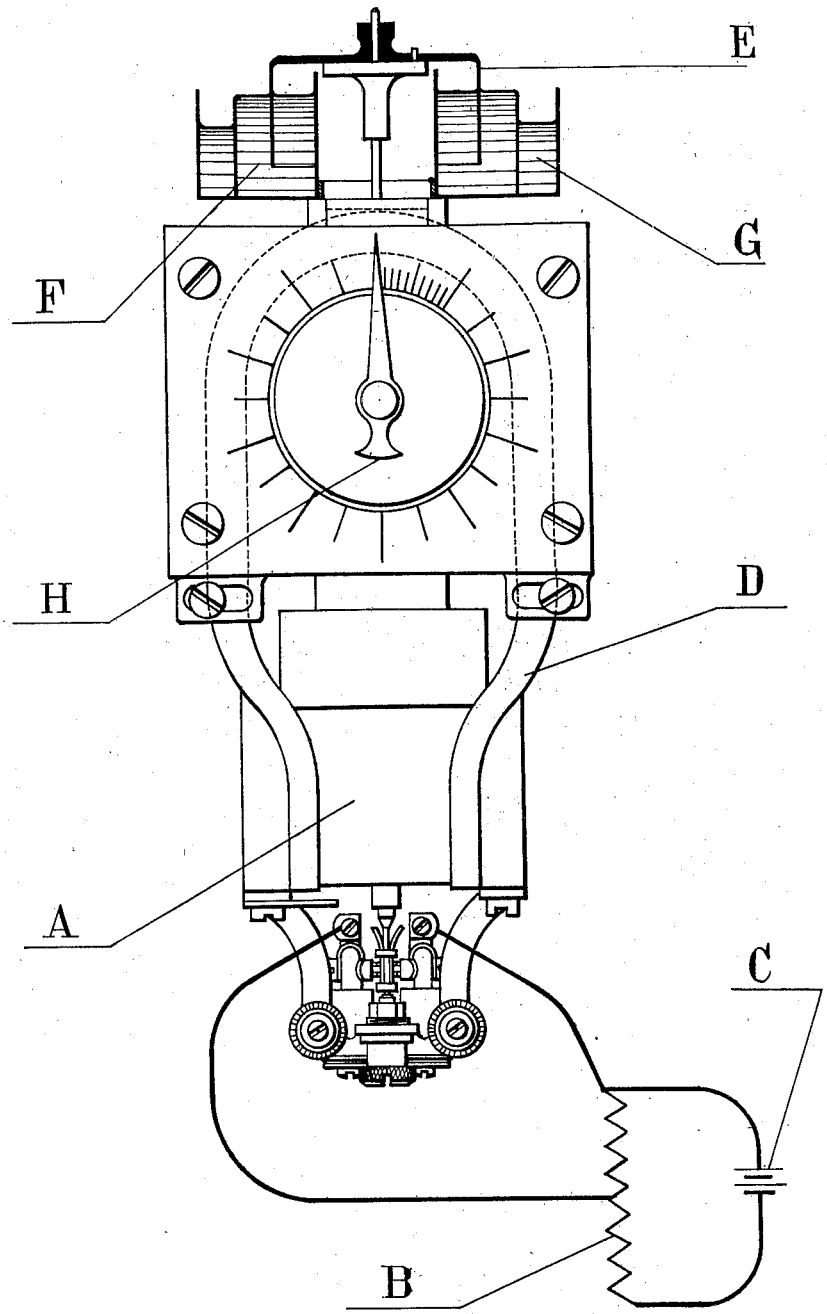

1,565,119

UNITED STATES PATENT OFFICE.

PIERRE JOSEPH THOMAS, OF MONTROUGE, FRANCE, ASSIGNOR TO COMPAGNIE POUR LA FABRICATION DES COMPTEURS ET MATERIEL D'USINES À GAZ, OF MONTROUGE, FRANCE.

VISCOSIMETER.

Application filed February 13, 1924. Serial No. 692,573.

*To all whom it may concern:*

Be it known that I, PIERRE JOSEPH THOMAS, citizen of the Republic of France, residing at 10 Place des Etats-Unis, Montrouge, Seine, France, have invented new and useful Improvements in Viscosimeters, of which the following is a specification.

The present invention relates to an apparatus for determining the viscosity of a liquid by the braking action exerted by said liquid upon a solid body moving therein under the action of an electric motor.

A form of realization of the present invention is shown, by way of example, in the accompanying drawing, in elevation and partly in section.

The apparatus consists essentially:

1. Of an electric motor constituted by an armature A, shunt-connected to a resistance B, through which there passes the current from an accumulator or battery C, said armature being arranged in the field of a permanent magnet D.

2. Of a removable rigid bell E, mounted upon the shaft of the motor and immersed in an annular bath F which is also removable. This bath is intended to receive the liquid whose viscosity is to be determined and is provided with an overflow G, and is fixed upon the frame of the motor.

A graduated dial H, in front of which there moves a pointer driven by the shaft of the motor by means of a set of gearwheels, permits of measuring by means of a chronometer, the time during which the bell effects a predetermined number of revolutions.

For a given difference of potential at the terminals of the armature, the bell revolves more quickly in proportion as the liquid is more fluid.

When it is desired to ascertain the manner in which the viscosity varies with the temperature, the bath, filled with liquid, and the bell, are placed in an enclosure having a known temperature, which is either higher or lower than the temperature of the atmosphere, whereupon the whole is placed upon the motor, the bath and the bell being adapted to assume their definitive positions rapidly and with facility; a thermometer is then placed in the overflow of the bath, the motor is started and records are taken during the cooling or heating of the liquid.

With a view to varying the temperature of the liquid under examination, any other suitable means can be employed, such as a heating resistance, a heating or refrigerating coil, a movable bath adapted to cover the upper portion of the apparatus, or predetermined calorific radiations and the like.

It is evident that the bell may be of any suitable form, that the dial may be replaced by a tachometer, it is also possible to estimate, with the aid of a milliamperemeter the variations in the intensity of the current circulating in the armature which correspond to the variations in speed.

A height-regulating device (not shown in the drawing) is provided for the bath, which enables the submerged portion of the bell to be varied, with a view to regulating the apparatus.

I claim:

1. An apparatus for measuring the viscosity of a liquid comprising in combination a tank to contain the liquid to be tested, a bell depending into said tank and having its lower end adapted to be immersed in said liquid, a motor for rotating said bell at a speed governed by the degree of resistance offered by the fluid in said tank to the rotation of said bell, said bath being removably mounted on the frame of said motor and means for indicating the speed of rotation of said bell.

2. An apparatus for measuring the viscosity of a liquid comprising in combination a tank to contain the liquid to be tested, a bell depending into said tank and having its lower end adapted to be immersed in said liquid, a motor adapted to rotate said bell at a speed governed by the degree of resistance offered by the fluid in said tank to the rotation of said bell, said bell being detachably connected to said motor and means for indicating the speed of rotation of said bell.

3. An apparatus for measuring the viscosity of liquids comprising in combination a tank to contain the liquid to be tested, a bell depending into said tank and having its lower end adapted to be immersed in said liquid, a source of electric current, an electric motor shunt-connected to said source of current and adapted to rotate said bell, and means for indicating the speed of rotation of said bell.

4. An apparatus for measuring the viscosity of liquids comprising in combination a tank to contain the liquid to be tested, a bell depending into said tank and having its lower end adapted to be immersed in said liquid, a source of electric current, a motor shunt-connected to said source of current and adapted to rotate said bell, a permanent magnet enclosing in its field the armature of said motor, and means for indicating the speed of rotation of said bell.

PIERRE JOSEPH THOMAS.